United States Patent
Tong

(10) Patent No.: US 12,028,116 B2
(45) Date of Patent: Jul. 2, 2024

(54) HDMI MATRIX SWITCHER RECEIVING SIDE AND RECEIVER-SIDE FIBER CONNECTOR POWER MANAGEMENT

(71) Applicant: Celerity Technologies Inc., Irvine, CA (US)

(72) Inventor: Xiaolin Tong, Irvine, CA (US)

(73) Assignee: Celerity Technologies Inc., Irvine, CA (US)

( * ) Notice: Subject to any disclaimer, the term of this patent is extended or adjusted under 35 U.S.C. 154(b) by 0 days.

(21) Appl. No.: 17/808,934

(22) Filed: Jun. 24, 2022

(65) Prior Publication Data

US 2023/0421259 A1 Dec. 28, 2023

(51) Int. Cl.
*H04B 10/80* (2013.01)
*G06F 1/26* (2006.01)
*G06F 13/40* (2006.01)
*H04B 10/25* (2013.01)

(52) U.S. Cl.
CPC ........... *H04B 10/808* (2013.01); *G06F 1/266* (2013.01); *G06F 13/4063* (2013.01); *H04B 10/25* (2013.01); *H04B 10/806* (2013.01)

(58) Field of Classification Search
CPC .............. H04B 10/25; H04B 10/25756; H04B 10/25891; H04B 10/278; H04B 10/806; H04B 10/808; H04B 10/807; G06F 1/266; G06F 13/382; G06F 13/4063; H04N 7/22; H04N 5/268; H04N 5/765; H04Q 11/0005
See application file for complete search history.

(56) References Cited

U.S. PATENT DOCUMENTS

| | | | |
|---|---|---|---|
| 9,134,493 B2* | 9/2015 | Tong | G02B 6/4401 |
| 11,005,531 B1* | 5/2021 | Delshadpour | H04B 3/548 |
| 2005/0105913 A1* | 5/2005 | Ozeki | H04B 10/07955 |
| | | | 398/140 |
| 2007/0233906 A1* | 10/2007 | Tatum | G06F 13/28 |
| | | | 710/26 |
| 2011/0316962 A1* | 12/2011 | Doi | H04N 21/43635 |
| | | | 348/14.01 |
| 2014/0125684 A1* | 5/2014 | Lin | G09G 5/363 |
| | | | 345/520 |
| 2019/0018465 A1* | 1/2019 | Whitby-Strevens | G06F 1/28 |
| 2020/0233166 A1* | 7/2020 | Shimizu | H04B 10/073 |
| 2020/0295846 A1* | 9/2020 | Bai | H04B 10/803 |
| 2022/0045762 A1* | 2/2022 | Chuang | H04B 10/40 |
| 2023/0119332 A1* | 4/2023 | Tong | G02B 6/4246 |
| | | | 385/101 |

* cited by examiner

Primary Examiner — Thomas J. Cleary
(74) Attorney, Agent, or Firm — Chen Yoshimura LLP

(57) ABSTRACT

In an HDMI (High Definition Multimedia Interface) video signal transmission system in which a fiber optic cable connects the HDMI transmitter and receiver, the HDMI receiver supplies a DC power to the receiver-side connector of the fiber optic cable on a designated pin of the HDMI interface, such as pin 14 of the Type A interface. The DC power does not affect the AC signal (e.g. ARC) transmitted on this pin under the HDMI specification. The receiver-side connector uses this power to power its internal components such as optical transceiver and signal processing chips. This eliminates the need to supply power to the receiver-side connector via a separate USB cable. One example of the HDMI receiver is a video matrix switch, which acts as a receiver for devices plugged into its input HDMI ports. A fiber optic cable incorporating Bluetooth wireless chips in its two connectors is also disclosed.

5 Claims, 2 Drawing Sheets

HDMI MATRIX SWITCHER RECEIVING SIDE AND RECEIVER-SIDE FIBER CONNECTOR POWER MANAGEMENT

BACKGROUND OF THE INVENTION

This invention relates to transmission of video signals by fiber optic cables, and in particular, it relates to a power supply and management system for HDMI (High Definition Multimedia Interface) connectors for fiber optic cables, and related methods.

Due to their large bandwidth and long reach, fiber optic cables are widely used to transmit data. For example, fiber optic cables may be used to transmit video, audio and other signal between video sources (such as video players, video signal switches, computers, etc.) and display devices (such as digital televisions, monitors, etc.). Electronic devices are typically equipped with ports for data communication, where the ports typically comply with various industry standards such as USB (Universal Serial Bus), HDMI (High Definition Multimedia Interface), DP (DisplayPort), DVI (Digital Visual Interface), VGA (Video Graphics Array), etc. Connectors between fiber optic cable and HDMI, DP, DVI, and Keystone ports have been available.

A fiber optic cable for standard video signal transmission, such as HDMI video signals, typically includes a cable containing a plurality optical fibers, and two connectors at the two ends of the cable for plugging into electrical signal transmission ports of the video source and display device. Each connector includes an optical transceiver (including light emitting devices, e.g. laser diodes, and light detecting devices, e.g. photodiodes) that performs electrical-to-optical and optical-to-electrical signal conversion, and electrical signal processing circuitry that controls the optical transceiver and performs various electrical signal processing functions. These components within the transmitter-side and receiver-side connectors require external power to operate.

SUMMARY OF THE INVENTION

The present invention is directed to a video signal transmission system employing fiber optic transmission cable that substantially obviates one or more of the problems due to limitations and disadvantages of the related art.

An object of the present invention is to provide a more convenient power supply system for fiber optic cables in HDMI signal transmission systems.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides an HDMI (High Definition Multimedia Interface) fiber optic signal transmission cable, which includes: a cable including a plurality of optical fibers; a first connector connected to a first end of the cable, the first connector including: a first optical transceiver optically coupled to first ends of the optical fibers of the cable; a first control circuit electrically coupled to the first optical transceiver, configured to perform control and signal processing functions; a first HDMI interface having a first plurality of pins electrically coupled to the first control circuit; and a first power supply circuit coupled to a first designated pin of the first plurality of pins, configured to receive a first DC (direct current) voltage from the first designated pin and supply power to the first optical transceiver and the first control circuit; and a second connector connected to a second end of the cable, the second connector including: a second optical transceiver optically coupled to second ends of the optical fibers of the cable; a second control circuit electrically coupled to the second optical transceiver, configured to perform control and signal processing functions; a second HDMI interface having a first plurality of pins electrically coupled to the second control circuit; and a second power supply circuit coupled to a second designated pin of the second plurality of pins, configured to receive a second DC voltage from the second designated pin and supply power to the second optical transceiver and the second control circuit.

In some embodiment, the first and second HDMI interfaces are HDMI Type A interfaces, wherein the first designated pin is pin 18 and the second designated pin is pin 14.

In another aspect, the present invention provides an HDMI (High Definition Multimedia Interface) sink device, which includes: an HDMI interface configure to receive an HDMI connector; a signal processing circuit coupled to the HDMI interface, configured to process a video signal received from the HDMI interface; a video signal display and/or storage and/or output unit coupled to the signal processing circuit, configured to display and/or store and/or output the video signal; and a power supply circuit, coupled to a designated pin of the HDMI interface, configured to supply a DC (direct current) voltage on the designated pin.

In some embodiments, the power supply circuit includes an On/Off switch coupled to the designated pin, and wherein the sink device further comprises a control circuit coupled to the power supply circuit and configured to control the On/Off switch.

In another aspect, the present invention provides a video matrix switch, which includes: a plurality of input HDMI interfaces; a plurality of output HDMI interfaces; a switch coupled to the plurality of input HDMI interfaces and output HDMI interfaces, wherein the switch is operable to selectively connect each input port to one or more output ports; control circuitry coupled to the switch and configured to control operation of the switch; and a power supply circuit, coupled to a designated pin of each of the plurality of input HDMI interfaces, configured to supply a DC (direct current) voltage on the designated pin.

In some embodiments, some of the plurality of input HDMI interfaces are HDMI Type A interfaces and the corresponding designated pins are pin 14.

In some embodiments, the power supply circuit includes a plurality of On/Off switches, each coupled to one of the plurality of input HDMI interfaces, and wherein the video matrix switch further comprises a control circuit coupled to the power supply circuit and configured to control each of the plurality of On/Off switches.

In another aspect, the present invention provides a fiber optic video signal transmission cable that facilitates Bluetooth signal communication between the two ends, which includes: a cable including a plurality of optical fibers; a first connector connected to a first end of the cable, the first connector including: a first optical transceiver optically coupled to first ends of the optical fibers of the cable; a first control circuit electrically coupled to the first optical transceiver, configured to perform control and signal processing functions; a first video signal transmission interface electrically coupled to the first control circuit; and a first Bluetooth wireless communication circuit coupled to the first control circuit, configured to communicate wirelessly with one or more Bluetooth enabled human interface devices; wherein the first control circuit is configured to process signals and forward signals between the first Bluetooth wireless communication circuit and the first optical transceiver; and a second connector connected to a second end of the cable, the second connector including: a second optical transceiver optically coupled to second ends of the optical fibers of the cable; a second control circuit electrically coupled to the second optical transceiver, configured to perform control and signal processing functions; a second video signal transmission interface electrically coupled to the second control circuit; and a second Bluetooth wireless communication circuit coupled to a second control circuit, configured to communicate with a Bluetooth host device; wherein the second control circuit is configured to process signals and forward signals between the second Bluetooth wireless communication circuit and the second optical transceiver.

It is to be understood that both the foregoing general description and the following detailed description are exemplary and explanatory and are intended to provide further explanation of the invention as claimed.

DETAILED DESCRIPTION OF THE INVENTION

The HDMI specification requires that at the source side, the transmitter device applies a 5V DC (direct current) voltage at a pin of the HDMI interface (e.g. pin 18 in HDMI Type A interface). When a conventional HDMI cable employing metal wires is used for signal transmission, the 5V DC voltage is transmitted to the sink side (receiver). This DC voltage may be used, for example, to power certain circuitry of the receiver for information exchange (e.g., DDC, EDID) even when the receiver is turned off. Under the HDMI specification, the receiver device does not supply a DC voltage to its HDMI interface. It should be understood that 5V means approximately 5V, for example, 4.8 V to 5.3 V.

As discussed earlier, in a fiber optic video signal transmission cable (also referred to as a fiber extender), various components within the transmitter-side and receiver-side connectors require external power to function. At the transmitter side, the connector may use the 5V voltage supplied by the transmitter device to power its internal components. However, an all-fiber transmission cable is incapable of transmitting the 5V electrical signal to the receiver side to power the receiver-side connector. Thus, a conventional all-fiber video signal transmission cable requires an independent (i.e., independent of the HDMI interface) power supply to power its receiver-side connector. For example, power may be provided by an additional USB cable with an USB plug, extending from the receiver-side connector.

When connecting such a fiber optic cable to an HDMI receiver device, the USB plug is plugged into a USB port of the receiver device or a separate USB power outlet. This is inconvenient. In particular, for certain devices such as video matrix switches, a large number of fiber optic cables may be plugged into the switch, requiring a large number of USB ports for power supply and a large umber of additional USB cables that need to be physically managed.

To address the above problems, embodiments of the present invention provide a system in which the HDMI receiver (sink) supplies a DC power via the HDMI interface to the receiver-side connector of a fiber optic HDMI cable, and the receiver-side connector utilizes the DC power to power its internal components including the optical transceiver and electrical signal processing circuitry. Power is supplied via the receiver-side HDMI interface without affecting other required operations of HDMI signal transmission, so that the system complies with all HDMI requirements despite the added DC power supply.

Figure 1:
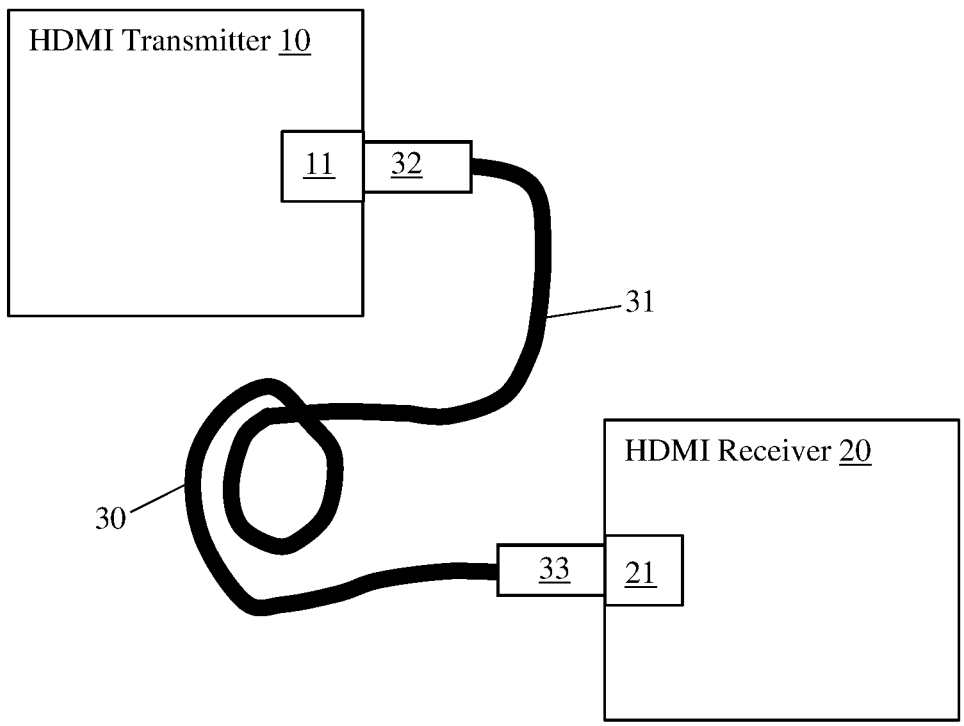
FIG. 1 schematically illustrates a video signal transmission system employing a fiber optic cable according to a first embodiment of the present invention.

FIG. 1 schematically illustrates a fiber optic video signal transmission system according to a first embodiment of the present invention. The system includes an electronic device 10 that act as an HDMI transmitter (e.g., video player, computer, video signal switch, etc., or the video output card of such a device), an electronic device 20 that acts as an HDMI receiver (e.g., digital television, monitor, video signal switch, etc., or the video input card of such a device), and a fiber optic signal transmission cable 30 connecting the transmitter and the receiver. The signal transmission cable 30 includes a fiber optic cable 31 having a plurality of optical fibers, a transmitter-side connecter 32 for connecting to an HDMI interface (port) 11 of the transmitter 10, and a receiver-side connecter 33 for connecting to an HDMI interface (port) 21 of the receiver 20. Each of the transmitter-side connecter 32 and receiver-side connecter 33 includes an optical transceiver and electrical signal processing circuitry. Preferably, the fiber optic cable 31 is an all-fiber cable having no electrical conductor wires between the two connectors.

The HDMI transmitter 10 may be a conventional device. As required by the HDMI specification, the transmitter 10 supplies a 5V, 300 mA DC power on one of the pins of the HDMI interface, e.g. pin 18 of an HDMI Type A interface.

The HDMI receiver 20, on the other hand, is different from conventional HDMI receivers in that it supplies a DC power to the receiver-side connector 33 via a pin of the HDMI interface that is either reserved or designed to transmit an AC (alternating current) signal under the HDMI specification. In one implementation, pin 14 of the HDMI Type A interface, which is designed for transmitting the ARC (Audio Return Channel) signal, is used for this purpose. A DC signal (e.g. 5V, 300 mA) is superimposed onto the ARC signal (an AC signal) transmitted on this pin. The DC signal does not affect the AC signal transmission and processing, even when a conventional metal HDMI cable is used to connect the receiver 20 to a conventional HDMI transmitter. The receiver-side connector 33 uses the DC signal to power its internal components.

Figure 2:
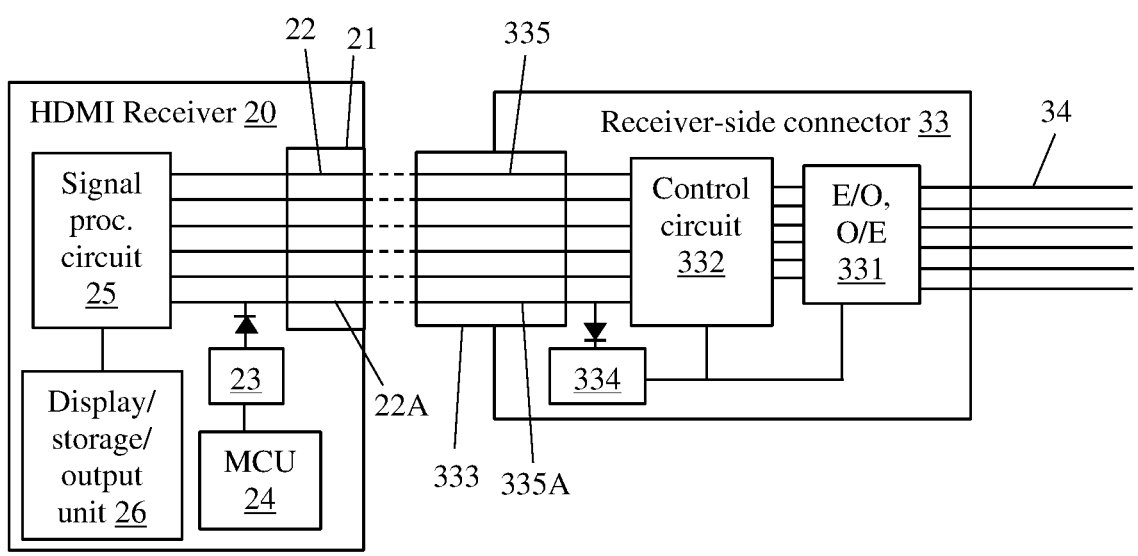
FIG. 2 schematically illustrates the HDMI receiver and the receiver-side connecter of the embodiment of FIG. 1.

FIG. 2 schematically illustrates the HDMI receiver 20 and the receiver-side connecter 33 of the embodiment of FIG. 1 in more detail. The receiver-side connecter 33 includes an optical transceiver 331 optically coupled to a set of optical fibers 34 of the fiber optic cable 31, electrical circuitry 332 electrically coupled to the optical transceiver 331, and an HDMI interface (plug) 333 having a set of pins 335 electrically coupled to the electrical circuitry 332. The optical transceiver 331 performs optical-to-electrical and/or electrical-to-optical signal conversion between the optical fibers 34 and the electrical circuitry 332. The electrical circuitry 332, which may include a PCB (printed circuit board) and various electrical components and IC chips mounted thereon, performs various control and signal processing functions not described in detail here.

The receiver 20 includes an HDMI interface (port) 21 configured to mate with the receiver-side connector 33 for signal transmission (e.g., the plug 333 may be inserted into the port 21). The HDMI port 21 has a set of pins 22 that couple to the corresponding pins 335 of the HDMI plug 333 when the plug is inserted.

The receiver 20 further includes a power supply circuit 23, coupled to one of the pins 22A of the receiver HDMI interface 21 to apply a DC voltage (e.g. 5V, 300 mA) to the pin. Preferably, the power supply circuit 23 includes a diode to prevent reverse power. The pin 22A may be additionally coupled to receive an AC signal, such as the ARC signal, from another component of the receiver 20 (not shown in FIG. 2). I.e., the signal applied to pin 22A includes a DC component as well as an AC component representing a signal to be transmitted between the receiver 20 and transmitter 10.

The receiver-side connector 33 includes a power supply circuit 334 coupled to a pin 335A (e.g. pin 14) of the HDMI interface 333 that corresponds to pin 22A of the receiver's HDMI interface 21. The power supply circuit 334 is configured to receive the DC signal on this pin and to supply power to other components of the receiver-side connector 33. Preferably, the power supply circuit 334 includes a diode to prevent reverse power. The pin 335A is also fed into the electrical circuitry 332, which processes the AC signal on the pin according to the HDMI specification.

In some embodiments, the power supply circuit 23 on the receiver 20 is configured to control the On and Off of the DC signal supply on pin 22A. As a result, the receiver 20 is able to control the On and Off of the operation of the receiver-side connector 33. For this purpose, the power supply circuit 23 may be coupled to a control circuitry 24 (e.g. an MCU) of the receiver 20 to receive control signals. The control circuitry 24 may performs various other control and signal processing functions.

The power supply circuits 23 and 334 may be implemented by any suitable circuits. In actual implementation, they may be accomplished by making suitable modifications to conventional HDMI receivers and conventional connectors of fiber optic HDMI cables. For example, the receiver power supply circuit 23 may be implemented by taking advantage of the existing internal 5V power supply circuit of the conventional HDMI receiver, and adding a conductor trace to connect the 5V output to pin 22A, with an optional On/Off switch (e.g., a semiconductor switching device) on the conductor, where the On/Off switch is connected to and controlled by a modified control circuitry (e.g. MCU 24) of the receiver 20. On the receiver-side connector 33, the power supply circuit 334 may be implemented by taking advantage of the existing power supply circuit of the conventional connector, and connecting its input to pin 335A rather than to a USB port as in the case of the conventional connector.

Other components of the receiver 20, such as signal process circuits 25 that process the HDMI video signal, a video signal display/storage/output unit 26 for displaying and/or storing and/or outputting the video signal depending on the nature of the sink device (television, monitor, digital video recorder, set-top box etc.), are conventional and not described in detail here. Note that the illustration in FIG. 2 is schematic only, and the number of optical fibers and electrical conductors depicted therein may or may not reflect the actual number of lines in each set.

The transmitter-side connecter 32 has a similar structure as the receiver-side connecter 33, but its power supply circuit receives a DC power on a different pin as specified by the HDMI standard, for example, pin 18 for HDMI Type A interface. The control and signal processing circuitry in the transmitter-side connecter 32 may perform different functions than that of the receiver-side connecter 33.

Figure 3:
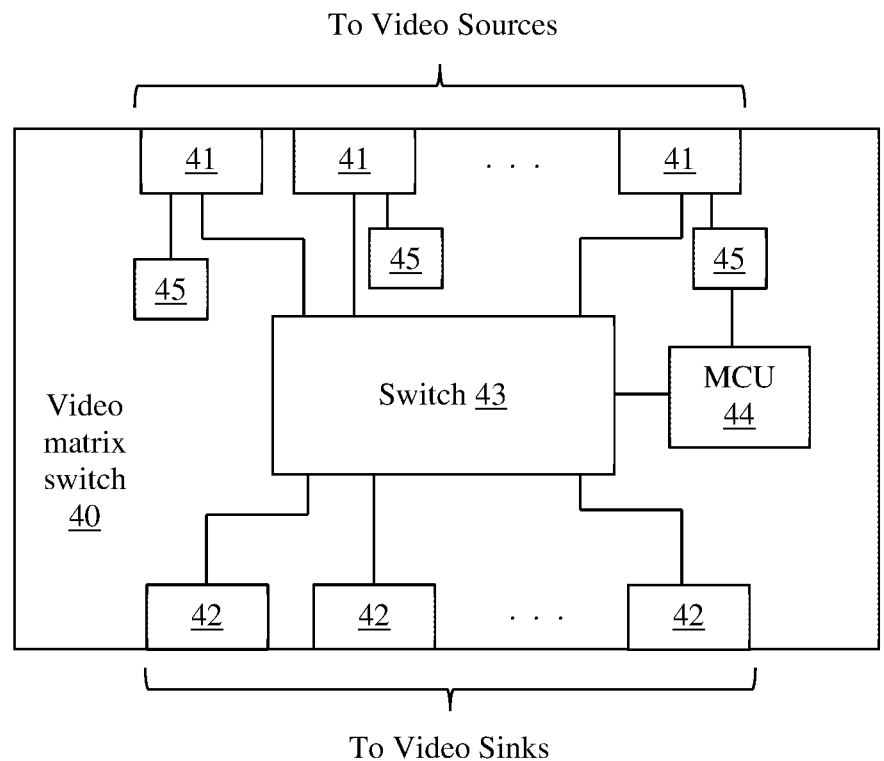
FIG. 3 schematically illustrates a video matrix switch according to a second embodiment of the present invention.

FIG. 3 schematically illustrates a video matrix switch 40 according to a second embodiment of the present invention. The video matrix switch 40 has a plurality of input HDMI interfaces (input ports) 41 for connecting to HDMI source devices, a plurality of output HDMI interfaces (output ports) 42 for connecting to HDMI sink devices, a matrix switch 43 coupled to the plurality of input and output ports, and control circuitry 44 that controls the operation of the switch 43 and other components of the video matrix switch 40. The matrix switch 43 is controlled to selectively connect each input port to one or more output ports. The video matrix switch 40 acts as an HDMI sink to the connected HDMI source devices, and as an HDMI source to the connected HDMI sink devices. Each input port 41 is configured to receive a receiver-side connector 33 of a fiber optic signal transmission cable 30, or a conventional HDMI connection cable; each output port 42 is configured to receive a transmitter-side connector 32 of a fiber optic signal transmission cable 30, or a conventional HDMI connection cable. Each fiber optic signal transmission cable 30 may have a structure similar to the cable of the first embodiment shown in FIGS. 1 and 2.

A power supply circuit 45 is coupled to each input port 41 to provide a DC power (e.g., 5V, 300 mA) on a pin of the input HDMI interface (e.g., pin 14 of HDMI Type A interface). Although depicted in FIG. 3 as separate boxes, the power supply circuit 45 may be implemented as one circuit with multiple separate output conductors each coupled to an input port 41. Preferably, the power supply circuit 45 includes one or more diodes to prevent reverse power, similar to the configuration shown in FIG. 2.

In some embodiments, the power supply circuit 45 may include a plurality of On/Off switches to separately control the On and Off of the DC power for each input port 41, so that the video matrix switch 40 can individually control the On and Off of the operation of each signal transmission cable 30 plugged into the input ports. This control ability brings many advantages. For example, it makes link reset more flexible. In another example, during system On or Off, timing control may be carried out to spread current demand from the multiple input ports 41 more uniformly over a time period. For these control purposes, the power supply circuit 45 may be coupled to the control circuitry 44 (e.g. an MCU) to receive control signals.

In some embodiments, the power supply circuit 45 may be implemented by modifying a conventional video matrix switch, for example, by adding conductors to connect the output of an existing internal 5V power supply circuit of the video matrix switch to the designated pin of each input port 41, with an optional On/Off switch on each conductor, where the On/Off switches are connected to and controlled by a modified control circuitry (e.g. MCU 44) of the video matrix switch.

Note that although not illustrated in FIG. 3, the power supply circuit 45 (or another power supply circuit) also supplies a DC voltage to each of the output HDMI interfaces, e.g., on pin 18 of HDMI Type A interfaces, as required by the HDMI specification.

One practical example of the video matrix switch 40 is a videowall controller which receives video signals from a plurality of video sources and transmit them to a plurality of display devices that are spatially arranged to form a larger display (videowall).

Although HDMI Type A interface is used above as an example, the invention may be implemented in other HDMI interface types. For example, in Type C, pin 14 is the ARC pin that may be used for power supply to the receiver-side connector.

Although the above descriptions use HDMI as an example of the video signal standard, the invention may be applied to systems complying with other industry standards if they suffer from the same problem that the transmitter and/or receiver device does not supply power to the fiber connectors.

In a fiber optic video signal transmission system like that shown in FIG. 1, human-machine interface devices (HID) such as keyboard, mouse, microphone and speaker, etc. are sometimes present and physically located near the HDMI receiver device 20 such as a monitor. Often these HID devices are intended to work with a computer or other host devices using Bluetooth technology; however, in a system like that shown in FIG. 1, the computer (HDMI transmitter) 10 is typically located outside of the range of Bluetooth communication. To solve this problem, according to another embodiment of the present invention, signals between the Bluetooth enabled HID devices and the computer are transmitted over the fiber optic HDMI cable by incorporating a Bluetooth wireless chip in each of the receiver-side connector and transmitter-side connector of the fiber optic cable.

Figure 4:
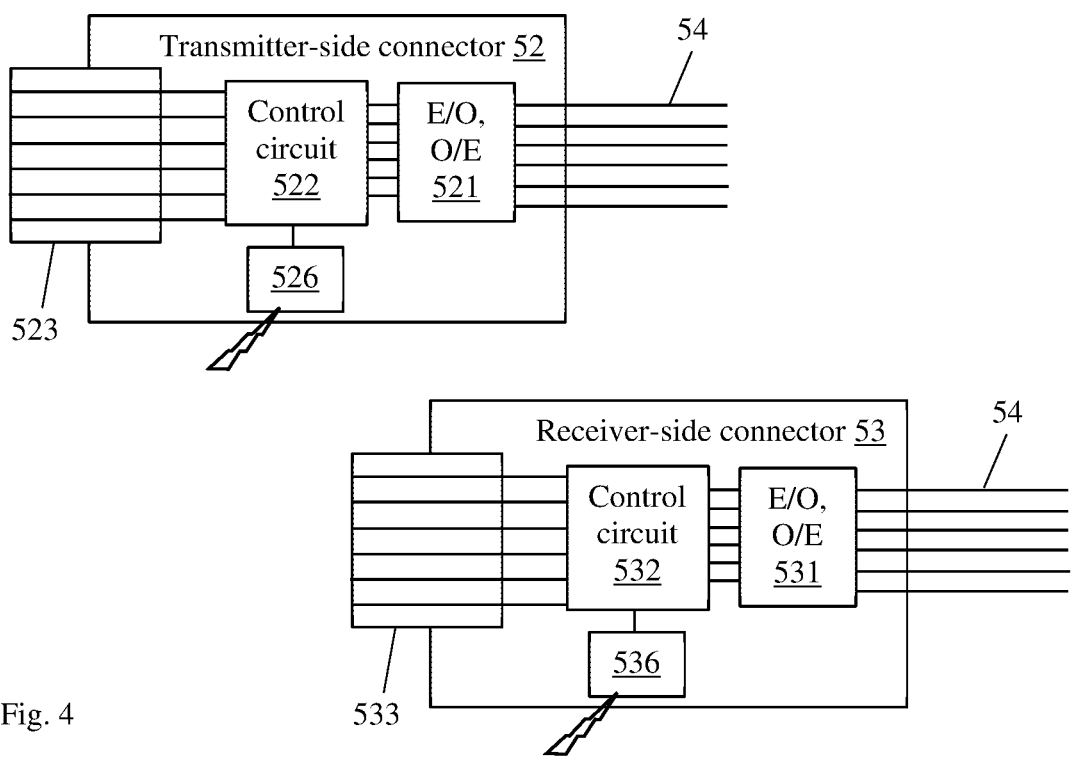
FIG. 4 schematically illustrates a receiver-side connecter and a transmitter-side connecter of a fiber optic cable according to another embodiment of the present invention.

In this embodiment, shown in FIG. 4, the transmitter-side connector 52 of the fiber optic HDMI cable includes an optical transceiver 521 optically coupled to the optical fibers 54 of the cable, electrical circuitry 522 electrically coupled to the optical transceiver, an HDMI interface (plug) 523 coupled to the electrical circuitry 522, and a Bluetooth wireless communication chip 526 coupled to the electrical circuitry 522. Likewise, the receiver-side connector 53 of the fiber optic HDMI cable includes an optical transceiver 531 optically coupled to the optical fibers 54 of the cable, electrical circuitry 532 electrically coupled to the optical transceiver, an HDMI interface (plug) 533 coupled to the electrical circuitry 532, and a Bluetooth wireless communication chip 536 coupled to the electrical circuitry 532.

The Bluetooth chip 536 in the receiver-side connector 53 communicates with the Bluetooth HID devices located in the vicinity of the HDMI receiver 20 (e.g. monitor) using Bluetooth technology. The Bluetooth chip 526 in the transmitter-side connector 52 communicates with the HDMI transmitter 10 (e.g. computer equipped with Bluetooth wireless communication components) using Bluetooth technology. The Bluetooth signals are transmitted between the two Bluetooth chips 526 and 536 at the transmitter-side and receiver-side bidirectionally over the fiber optic cable, where the electrical circuitry 522 and 532 respectively process the Bluetooth signals and forward them between the Bluetooth chip 526 (or 536) and the corresponding optical transceiver 521 (or 531) for bidirectional transmission over the fiber optic cable. While the electrical circuitry 522 and 532 process the Bluetooth signals necessary for signal transmission, they do not interpret or otherwise act upon the Bluetooth signals. All actions required by the Bluetooth communication protocol are performed by existing components in the computer (the HDMI transmitter) and the HID devices. No modification is required for the computer and the HID devices; the signal transmission over the fiber optical cable is transparent to them. Details regarding Bluetooth wireless communication are well known to those skill in the relevant are and are not described further.

This way, when a computer is connected to a monitor using the fiber optic HDMI cable, Bluetooth HID such as keyboard, mouse, mic and/or speaker physically located near the monitor is able to communicate with the computer over the fiber optic HDMI cable. This eliminates the need for additional cables such as USB cables and related connectors.

The embodiment of FIG. 4 is not limited to HDMI video signal transmission cables; the interfaces 523 and 533 are not limited to HDMI interfaces, but can be any suitable interfaces such as DVI, DP, etc. In this regard, note that the HID signals are not transmitted through the HDMI (or DVI, DP, etc.) interfaces 523 and 533, and that the transmitter and receiver devices do not need to be modified to implement this embodiment.

In a fiber optic video signal transmission system like that shown in FIG. 1, HID devices are sometimes integrated with the HDMI receiver 20 (e.g., a touch panel display), or are physically connected to the HDMI receiver 20 using USB or RS232 interfaces. In such a case, the HID signals in USB or RS232 format may be transmitted between the HDMI receiver 20 and HDMI transmitter (e.g. computer) 10 over the fiber optic HDMI cable by suitable modifications of the transmitter and the receiver.

More specifically, when the connectors use an HDMI Type A interface, if pin 14 is not used for ARC signal, it may be used to transmit the USB or RS232 signal. Alternatively or in addition, the USB or RS232 signal may be transmitted on pin 19 of the HDMI Type A interface, which is assigned to HPD (hot plug detect, a DC signal) under the HDMI specification. By providing AC signal processing circuits coupled to the HDMI interfaces of the HDMI transmitter (computer) and receiver (monitor), an AC signal may be superimposed onto the HPD signal on pin 19, without affecting the function of the HPD signal. The AC receiving circuit may include, for example, an MCU or processor, or a digital filter. Further, the HDMI interface circuitry of the HDMI transmitter and receiver devices are modified to forward signals on these pins, i.e. HID signals in USB or RS232 format, to appropriate circuits of the HDMI transmitter and receiver devices. In this embodiment, the fiber optic cable connecting the HDMI transmitter and receiver may be an HDMI fiber optic cable similar to that shown in FIGS. 1 and 2, with or without the power supply circuit 334 coupled to the pin 335A in the receiver-side connector 33.

In another embodiment, the receiver-side connector 33 is equipped with a USB and/or RS232 connector, e.g., in the form of a dongle extending from the connector, so that USB and/or RS232 HID devices may be connected with the connector 33, and the HID signals may be transmitted to the HDMI transmitter (computer). In such a connector, the USB and/or RS232 interface is electrically coupled to the control circuit of the connector 33.

It will be apparent to those skilled in the art that various modification and variations can be made in the fiber optic video signal transmission system and related method of the present invention without departing from the spirit or scope of the invention. Thus, it is intended that the present invention cover modifications and variations that come within the scope of the appended claims and their equivalents.

The invention claimed is:

1. An HDMI (High Definition Multimedia Interface) fiber optic signal transmission cable, comprising:
   a cable including a plurality of optical fibers;
   a first connector connected to a first end of the cable, the first connector including:

a first optical transceiver optically coupled to first ends of the optical fibers of the cable;

a first control circuit electrically coupled to the first optical transceiver, configured to perform control and signal processing functions;

a first HDMI interface having a first plurality of pins electrically coupled to the first control circuit; and a first power supply circuit coupled to a first designated pin of the first plurality of pins, configured to receive a first DC (direct current) voltage from the first designated pin and supply power to the first optical transceiver and the first control circuit; and a second connector connected to a second end of the cable, the second connector including:

a second optical transceiver optically coupled to second ends of the optical fibers of the cable;

a second control circuit electrically coupled to the second optical transceiver, configured to perform control and signal processing functions;

a second HDMI interface having a first plurality of pins electrically coupled to the second control circuit; and a second power supply circuit coupled to a single second designated pin of the second plurality of pins, configured to receive a second DC voltage from the single second designated pin and supply power to the second optical transceiver and the second control circuit.

2. The HDMI fiber optic signal transmission cable of claim 1, wherein the first and second HDMI interfaces are HDMI Type A interfaces, wherein the first designated pin is pin 18 and the second designated pin is pin 14.

3. The HDMI fiber optic signal transmission cable of claim 1, wherein the second control circuit is configured to process an AC (alternating current) signal on the second designated pin.

4. The HDMI fiber optic signal transmission cable of claim 1, wherein the first DC voltage is a 5V voltage and the second DC voltage is a 5V voltage.

5. The HDMI fiber optic signal transmission cable of claim 1, wherein the cable includes no electrical conductor wires between the first and second connectors.

* * * * *